United States Patent [19]

Röhm

[11] 4,240,645
[45] Dec. 23, 1980

[54] FORCE-COMPENSATED SPLIT-JAW LATHE CHUCK

[76] Inventor: Günter H. Röhm, Heinrich-Röhm-Str. 50, 7927 Sontheim, Fed. Rep. of Germany

[21] Appl. No.: 59,145

[22] Filed: Jul. 20, 1979

Related U.S. Application Data

[63] Continuation-in-part of Ser. No. 40,128, May 18, 1979.

[30] Foreign Application Priority Data

| Jul. 22, 1978 [DE] | Fed. Rep. of Germany ....... 2832297 |
| Aug. 18, 1978 [DE] | Fed. Rep. of Germany ....... 2836191 |
| Oct. 17, 1978 [DE] | Fed. Rep. of Germany ....... 2845133 |

[51] Int. Cl.$^3$ ............................................. B23B 31/16
[52] U.S. Cl. ...................................... 279/1 C; 279/121
[58] Field of Search ............ 279/1 C, 110, 121, 1 ME

[56] References Cited

U.S. PATENT DOCUMENTS

| 4,047,723 | 9/1977 | Buck .................................... 279/1 C |
| 4,078,814 | 3/1978 | Rohas .................................... 279/1 C |
| 4,097,053 | 6/1978 | Steinberger ........................... 279/1 C |

FOREIGN PATENT DOCUMENTS

| 2132130 | 1/1973 | Fed. Rep. of Germany .......... 279/1 C |
| 2542569 | 4/1977 | Fed. Rep. of Germany .......... 279/1 C |
| 1541011 | 2/1979 | Fed. Rep. of Germany .......... 279/1 C |

*Primary Examiner*—William R. Briggs
*Attorney, Agent, or Firm*—Karl F. Ross

[57] ABSTRACT

A lathe chuck has a chuck body rotatable about a chuck axis and formed with a plurality of angularly spaced radially extending inner guides receiving respective inner jaw parts and with a plurality of angularly spaced and radially extending outer guides receiving respective outer jaw parts. An operating element is engageable with the inner jaw parts for radially displacing same in the chuck body in the respective inner guides. Coupling members are each axially displaceable by respective radially displaceable cams in the inner jaw parts and are each displaceable between a coupling position engaging the respective outer jaw part and coupling same to the respective inner jaw part for joint radial movement thereof, and a decoupling position for relative radial displacement of the respective jaw parts. Adjacent each of the jaws is a radially displaceable weight, and a first-class lever has a center fulcrumed in the chuck body, a rear end in radial force-transmitting engagement with the respective weight, and a front end in radial force-transmitting engagement with the respective inner jaw part, to convert centrifugally outwardly effective forces in the weights to centrifugally inwardly effective forces in the inner jaw parts. The front ends of the levers are pivoted in the respective inner jaw parts, and each cam is engageable on displacement into the decoupling position with the respective front lever end to displace the respective coupling member into the decoupling position.

10 Claims, 2 Drawing Figures

FORCE-COMPENSATED SPLIT-JAW LATHE CHUCK

CROSS-REFERENCE TO RELATED APPLICATION

This application is a continuation-in-part of my copending application Ser. No. 40,128 filed May 18, 1979.

FIELD OF THE INVENTION

The present invention relates to a force-compensated split-jaw lathe chuck.

BACKGROUND OF THE INVENTION

A standard split-jaw lathe chuck has a chuck body rotatable about a chuck axis and formed with a plurality of angularly spaced and radially extending inner guides receiving respective inner jaw parts, and with a plurality of angularly spaced and radially extending outer guides receiving respective outer jaw parts that project axially from the chuck body. Respective coupling members are axially displaceable in the inner jaw parts between axially advanced coupling positions radially linking the respective jaw parts and axially retracted decoupling positions permitting relative radial displacement of the respective jaw parts. These coupling members may be jointly displaceable as described in U.S. Pat. No. 3,682,491 or independently displaceable as described in my earlier copending application Ser. No. 886,348 filed Mar. 14, 1978.

The advantage of such a structure is that it allows the outer jaw parts to be roughly adjusted for the workpiece to be clamped, so that only a modest radial stroke is necessary for the jaws to clamp the workpiece. As a result a large mechanical advantage can be gained in the device so that the operating member moves through a relatively long axial stroke to produce a relatively short radial stroke of the jaws. Hence a good mechanical advantage is obtained for extremely tight gripping of a workpiece. What is more exchanging of the jaws, or using jaw blanks such as described in my copending application Ser. No. 40,126 filed May 18, 1979, is also possible.

One of the recurring problems with such a chuck is that when spun during the machining operation the radially outwardly effective centrifugal forces on the jaws loosen the hold of these jaws on the workpiece. Thus it is known to provide force compensation such as described in my copending application Ser. No. 40,271 filed May 18, 1979, or in U.S. Pat. No. 2,729,459. In such an arrangement radially displaceable weights on the chuck body engage via force-converting members with the inner jaw parts so that radially outwardly effective centrifugal forces in these weights are converted into radially inwardly effective forces applied to the inner jaw parts. In this manner centrifugal forces can be balanced in the chuck.

These centrifugal forces are advantageously emloyed in split-jaw lathe chucks of the type described in my above-cited copending application Ser. No. 886,348 wherein radially displaceable cams are provided in each of the inner jaw parts engaging the respective coupling members. These cams are radially displaceable between outer positions urging the coupling members forwardly into the coupling positions and radial inner positions allowing the coupling members to move axially backwardly. Thus in such a system the radially outwardly effective forces on these cams ensure that as rotation speed increases the forces pressing the coupling members into engagement with the respective outer jaw parts also increase.

My above-cited copending application Ser. No. 40,128 describes a chuck of the above-described general type and provided with a release ring rotatable on the chuck about its axis and formed with at least one radially inwardly extending projection engageable with the cams to move same into the inner positions against the forces of the respective springs that urge them outwardly. Otherwise these cams are received within inwardly open recesses of the rings and are completely covered thereby so that rotation of this release ring can decouple any of the inner and outer jaw parts.

Such arrangements, and others such as seen in my copending application Ser. No. 40,272 filed May 18, 1979, represent a substantial improvement over the prior art. Nonetheless such devices occasionally have shown some problems, in particular when force compensation is used in a split-jaw chuck.

OBJECTS OF THE INVENTION

It is therefore an object of the present invention to provide an improved force-compensated split-jaw chuck.

Another object of this invention is to provide such a chuck which operates smoothly and surely.

SUMMARY OF THE INVENTION

These objects are attained according to the instant invention is a force-compensated split-jaw lathe chuck wherein the force-transmission members are first-class levers having rear or back ends in radial force-transmitting engagement with the weights, front ends in radial force-transmitting engagement with the respective inner jaw parts, and center fulcrum parts pivoted on the body of the chuck. In accordance with this invention each of these levers is jointly axially displaceable with the respective coupling member, and can slide axially in the chuck body and in the respective weight. Thus when the chuck is spun at high speed the radially outwardly effective centrifugal forces in the weights are converted by these levers into radially inwardly effective forces that are applied through the axially displaceable coupling members to the respective inner jaw parts.

This can be achieved according to the instant invention by pivoting the front ends of the levers in the respective coupling members for pivoting about skew axes that each lie at the junction of a plane perpendicular to the chuck axis and a plane parallel thereto. In this manner the front end will move exactly radially opposite the rear end, for conversion of the perfectly radially outwardly effective force of the weight into a perfectly radially inwardly effective force on the respective inner part.

According to yet another feature of this invention each of the coupling members is slidable axially in the respective inner jaw part and is formed with a radially throughgoing passage through which the respective cam pin extends. In addition each coupling member is formed with an axially backwardly open passage opening into the radially throughgoing passage and receiving the front end of the force-converting pin. In turn the front tip of the force-converting pin is formed with inclined faces that can coact with similarly inclined faces of the cam pin. The cam pins themselves hold the respective coupling members in the coupling position, but to displace these coupling members into the decoupling position they are displaced radially inwardly against the force of their biasing springs and engage with their backward inclined surfaces against the similarly inclined surfaces of the respective levers. For displacement into the decoupling positions, therefore, the cams are engageable via the respective levers with the respective coupling members. Such an arrangement ensures that the cam pins act directly on the levers to displace them axially backwardly, so that wedging of these levers against the control members is largely ruled out. Similarly assembly and building of the entire mechanism is much simpler with this arrangement.

In accordance with further features of this invention the pivot is formed by at least one pair of balls which are received in a passage extending along the respective skew axis through the respective front lever end, and fitting into complementarily positioned recesses in the respective inner jaw parts. Pins extending longitudinally and generally axially through the respective levers urge these balls outwardly to engage in the recesses and form a sturdy but simple pivot.

Finally it is possible according to this invention to form each of the inner guides with a blocking surface that prevents backward displacement of the respective coupling member into the decoupling position unless the inner jaw parts are in predetermined radial outermost positions. In these radial outermost positions recesses formed in these blocking surfaces are axially aligned with the axially displaceable coupling members to allow them to move radially backwardly into the decoupling positions. Since most power lathes, that is lathes having cylinders that radially displace the jaws of the chuck, have safety switches which prevent starting up of the lathe unless the jaws have been displaced radially inwardly from the outermost positions, such an arrangement will effectively prevent the lathe from being rotated unless all the outer jaw parts are coupled securely to the respective inner jaw parts. Only when the coupling members are in their coupling positions can the jaws be moved radially inwardly to clamp on a workpiece.

SPECIFIC DESCRIPTION

Figure 1:
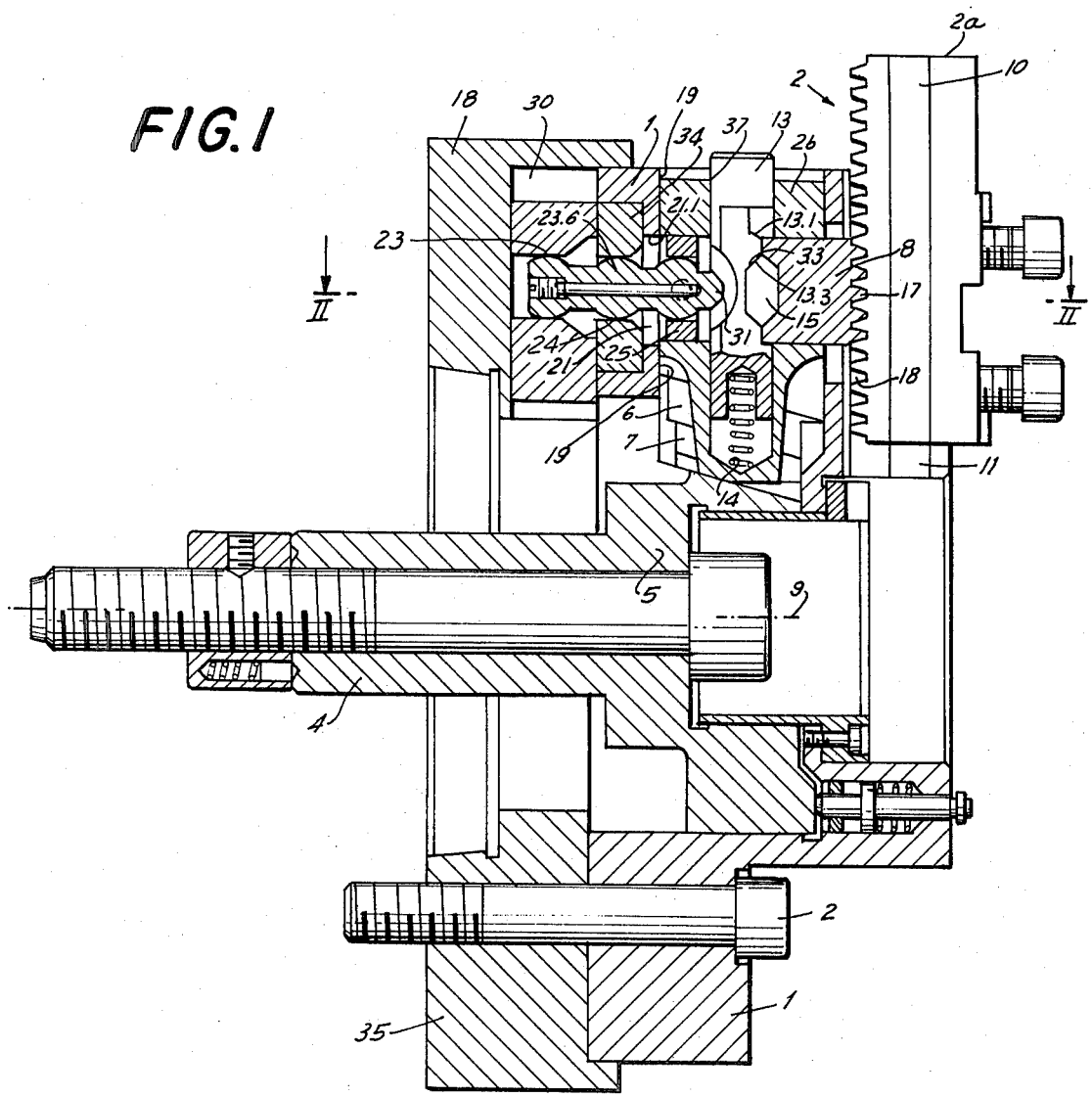
FIG. 1 is an axial section through a chuck according to this invention.

A chuck according to the instant invention has a chuck body 1 centered on a chuck axis 9 and having a rear plate 35 securable to the headstock of a lathe by means of machine screws 22. This chuck has three jaws generally indicated at 2 and each radially displaceable in a guide generally indicated at 3. More particularly each jaw 2 has an outer jaw part 2a radially displaceable in an outer guide formed by radially extending and interfitting rectangular-section grooves 10 and ridges 11, and an inner jaw part 2b radially reciprocal in cylindrical inner guide 12 communicating through a respective axially extending window 36 with the respective outer guide. According to this invention each inner jaw part 2b can be radially linked to the respective outer jaw part 2a by means of an axially slidable coupling member 8 having a front face formed with teeth 17 meshable with teeth 18 formed on the back face of the respective outer jaw part 2a. These outer jaw parts 2a may be fitted with jaw blanks of conventional type, or of the type described in my copending application Ser. No. 40,126 of May 18, 1979.

An operator 4 provided with an operating sleeve 5 is formed with so-called wedge hooks and engages wedge-hooks 7 formed on the inner jaw parts 2b. In this manner axial advance upwardly as seen in FIG. 1 will displace the jaws 2 radially outwardly and opposite displacement downwardly as seen in FIG. 1 will displace the jaws 2 radially inwardly. In FIG. 1 the sole jaw visible is in the radial outermost position.

Each of the inner jaw parts 2b is formed with a radially outwardly open blind bore 37 receiving the respective cam pin 13, with a compression spring 14 being braced against the radial inner end of each cam pin 13 and the blind end of the respective bore 37. Furthermore each of the coupling members 8 is formed with a radially throughgoing passage 15 through which the respective cam pin 13 also passes.

Each of the coupling members 8 is axially slidable between the illustrated coupling position with its teeth 17 meshing with the teeth 18 of the respective outer jaw part 2a to radially couple the respective jaw parts 2a and 2b together, and an axially backwardly withdrawn position with the teeth 17 and 18 out of mesh with each other and the outer jaw part 2a freely movable radially relative to the respective inner jaw part 2b. This axial backward displacement is effected by the cam pin 13 in a manner described below, and can only take place in the radial outermost position of the respective inner jaw part 2b, as only in this position are recesses 21 formed in a surface 19 of the chuck body 1 axially aligned behind the rear end of the coupling members 8. Thus when not in this radial outermost position it is impossible to displace the coupling member 8 of any of the jaws 2 axially backwardly to decouple the respective front and outer jaw parts 2a and 2b.

Each of the cam pins 13 has an axially forwardly directed side formed with inclined surfaces 13.1 flanking flat surfaces 13.3 lying in a plane perpendicular to the axis 9. The rear face of each of the coupling members 8 has a flat surface 33 that can stand flatly on the surfaces 13.3 to hold the respective coupling member 8 in the axially advanced coupling position as illustrated. When the surfaces 13.3 and 33 are aligned axially, therefore, the respective coupling member 8 will be positively held in its coupling position. Radial inward displacement of the respective cam pin 13 will allow the coupling member 8 to move radially backwardly, so long as it is aligned with the recess 21, to decouple the respective inner and outer jaw parts 2a and 2b.

In order to compensate for centrifugal forces which normally urge the jaws 2 outwardly, the chuck according to this invention is provided axially behind each of the jaws 2 with a weight 16 slidable in a radially extending guide 30. Each weight 16 engages one end 23.7 of a force-transmitting and -converting lever 23 fulcrumed in a ring 24 of the chuck body 1 and having an opposite end 23.1 received in the respective inner jaw part 2b. Thus this lever 23 is of the first-class type and converts radially outwardly effective forces in the respective weight 16 into radially inwardly effective forces in the respective inner jaw part 2b. In addition this lever 23 has a tip 31 received with clearance in a backwardly axially flared recess 38 having inclined side flanks 13.2. Each lever 23 is formed with rounded regions at each of its ends and at its fulcrum. Radially inward displacement of the respective locking cam pin 13 will bring the respective inclined surface 13.2 to bear on the tip 31 to displace it axially backwardly.

Figure 2:
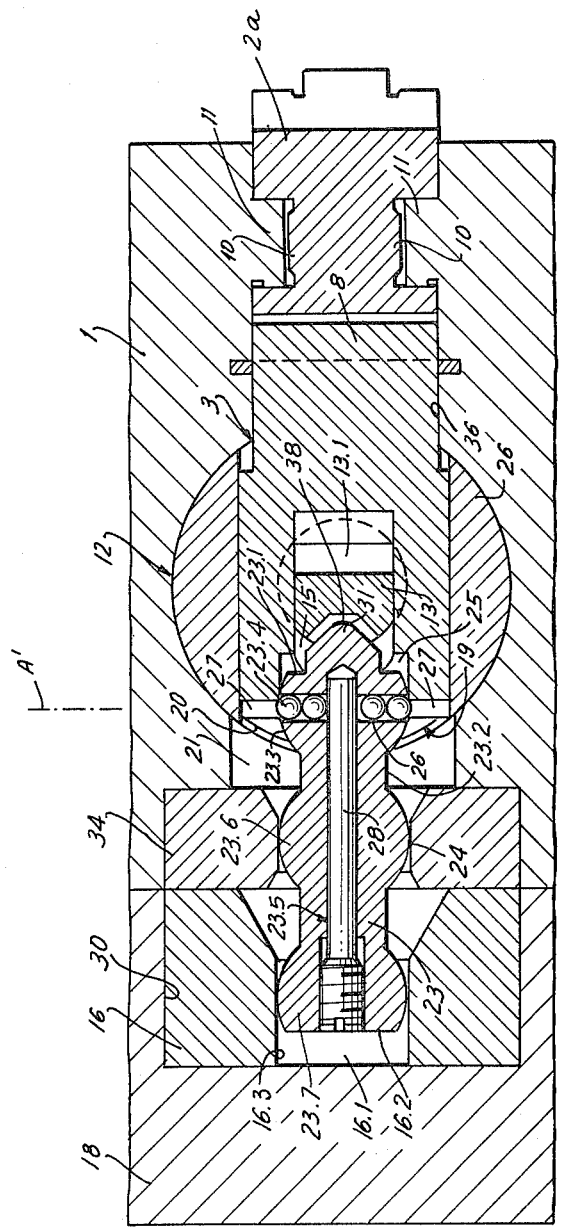
FIG. 2 is a large-scale section taken along the line II—II of FIG. 1.

FIG. 2 shows in more detail how the force-transmitting lever 23 has a central fulcrum-forming ball part 23.6 that can move axially in the cylindrical fulcrum surface 24 of a fulcrum ring 34, a front ball 23.1 received in the cylindrical recess 25 of the respective coupling member 8, and a rear ball head 23.7 riding on the cylindrical inner wall 16.3 of a cylindrical recess 16.1 of the respective weight 16. The rear ball 23.7 is formed with a tansverse flat 16.2 to allow backward axis displacement of the lever 23 from the illustrated advance position.

In addition the lever 23 is formed with an axially extending longitudinal passage 23.5 opening at its flat 16.2 and with a transverse throughgoing passage 23.3 defining an axis A' perpendicular to the axis of the passage 23.5 and lying at the junction of two planes, one of which is parallel to the axis 9 and the other of which is perpendicular thereto. Four balls 23.4 are received in the passage 23.3 and project axially therefrom into recesses 27 formed in the recess 25 of the member 8 so as to form a pivot 26 for the lever 23 about the axis A' in the member 8. A threaded pin 28 is received in the longitudinal passage 23.5 and forces the balls 23.4 axially into the recesses 27, so that withdrawal of this pin 28 can free the balls 23.4.

The tip 31 of the lever 23 has surfaces 31.1 that are inclined like the surfaces 13.2 but normally spaced from them relative to the axis 9 by a radial play 32 equal to the radial dimension of the flat surfaces 33 and 13.3. Since the lever 23 is linked by the pivot 26 to the coupling member 8, this means that radial depression of the actuating button 13 will first move the surfaces 33 and 13.3 out of axial alignment with each other, then after taking up the play 32 will bring the surfaces 13.1 and 13.2 into engagement with each other to cam back the lever 23, and simultaneously cam back the coupling member 8. This action of course disengages the teeth 17 and 18 from each other and allows the outer jaw part 2a to move relative to the respective inner jaw part 2b.

It must be noted, of course, that the actuating button 13 of any jaw 2 can only be actuated in the radial outermost position of the respective jaw 2. Only when the coupling member 8 is axially aligned with the respective recess 21, whose inner surface 21.1 is slightly larger in diameter so that the fit is not too difficult to make, can it move back and disengage the respective jaw parts 2a and 2b.

In use the centrifugally outwardly effective forces in the weights 16 are converted by the first class levers 23 into inwardly effective forces in the respective jaws 2. Thus the normal tendency of the jaws 2 to spread when the chuck is rotated at high speed is effectively countered. In fact making the weights 16 slightly heavier than the respective jaws 2 can insure increased holding force at high rotation speeds. High-speed rotation of the chuck will furthermore bias the actuating cams radially outwardly, into the coupling positions, so that accidental decoupling of an outer jaw part 2b from the respective inner jaw part 2a is impossible.

As in reality the radial stroke of the inner jaw parts 2b is relatively small, since coarse adjustments can be carried out by proper positioning of the outer jaw parts 2a, the levers 23 need be only limitedly tippable in the holes 24 of the fulcrum ring 34, and in the holes 16.3 of the respective weights 16. To this end these holes 16.3 and 24 are axially forwardly flared, and the holes 24 are also limitedly axially backwardly flared.

I claim:

1. A lathe chuck comprising:
   a chuck body rotatable about a chuck axis and formed with a plurality of angularly spaced and radially extending inner guides and with a plurality of angularly spaced and radially extendng outer guides;
   respective inner and outer jaw parts radially displaceable in said chuck body in said inner and outer guides;
   means including at least one operating element engageable with said inner jaw parts for radially displacing same in said chuck body in the respective inner guides;
   respective coupling members axially displaceable in said inner jaw parts and each displaceable between a coupling position engaging the respective outer jaw part and coupling same to the respective inner jaw part for joint radial movement therewith and a decoupling position for relative radial displacement of the respective jaw parts;
   respective cams radially displaceable in said inner jaw parts in engagement with the respective coupling members between radially outer positions holding the respective coupling members in said coupling positions and radially inner positions in which the respective coupling members can assume said decoupling positions;
   respective weights radially displaceable on said chuck body adjacent said inner jaw parts;
   respective levers centrally fulcrumed in said body and having axial back ends in radial force-transmitting engagement with said weights and axial front ends in radial force-transmitting engagement with the respective inner jaw parts, said levers being pivotal on said body first-class fashion with opposite radial displacement of the respective ends; and
   respective means for connecting said levers for going axial displacement with the respective coupling members, said levers being axially limitedly displaceable relative to the respective weights and to said body.

2. The chuck defined in claim 1 wherein the connecting means each include a pivot defining a respective skew pivot axis for the respective front end, said skew axes lying generally at the intersection of two planes, one of which is parallel to and the other of which is perpendicular to said chuck axis.

3. The chuck defined in claim 2 wherein each of said coupling members is formed at the respective skew axis with a pair of axially confronting and axially open recesses flanking the respective front end, said pivots including a pair of balls at each end of said front ends engaged in the respective pair of recesses.

4. The chuck defined in claim 3 wherein each front end is formed along the respective skew axis with a respective transverse passage receiving the respective balls.

5. The chuck defined in claim 4 wherein each of said levers is formed with a longitudinal passage crossing the respective transverse passage and provided with a respective longitudinal pin holding the respective balls in the respective recesses.

6. The chuck defined in claim 1 wherein each of said ends is partly spherical, said weights and coupling members being formed with axially extending cylindrical cutouts snugly received in the respective ends.

7. The chuck defined in claim 6 wherein said body is formed at each of said levers axially between the respective ends with a cylindrical fulcrum passage, each lever having a part-spherical center axially displaceable and snugly received in the respective fulcrum passage.

8. The chuck defined in claim 7, wherein said body includes a fulcrum ring having a plurality of angularly offset cylindrical cutouts constituting said fulcrum passages.

9. The chuck defined in claim 1 wherein said coupling members are axially slidable in the respective inner jaw parts and are formed with respective radially extending passages through which the respective cams extend, and with respective axially backwardly open passages into which the respective levers extend, said cams being engageable with said levers and being operatively engageable therethrough with the respective coupling members.

10. The chuck defined in claim 9 wherein said front ends and said cams have respective surfaces inclined to said chuck axis and flatly engageable with one another on radial inward displacement of said cams.

* * * * *